Oct. 16, 1928.  1,687,946
G. MASSIOT
APPARATUS FOR CHECKING THE PROFILES OF GEAR WHEELS, THE
PITCH OF SCREWS, AND SIMILAR ARTICLES
Filed Feb. 13, 1925
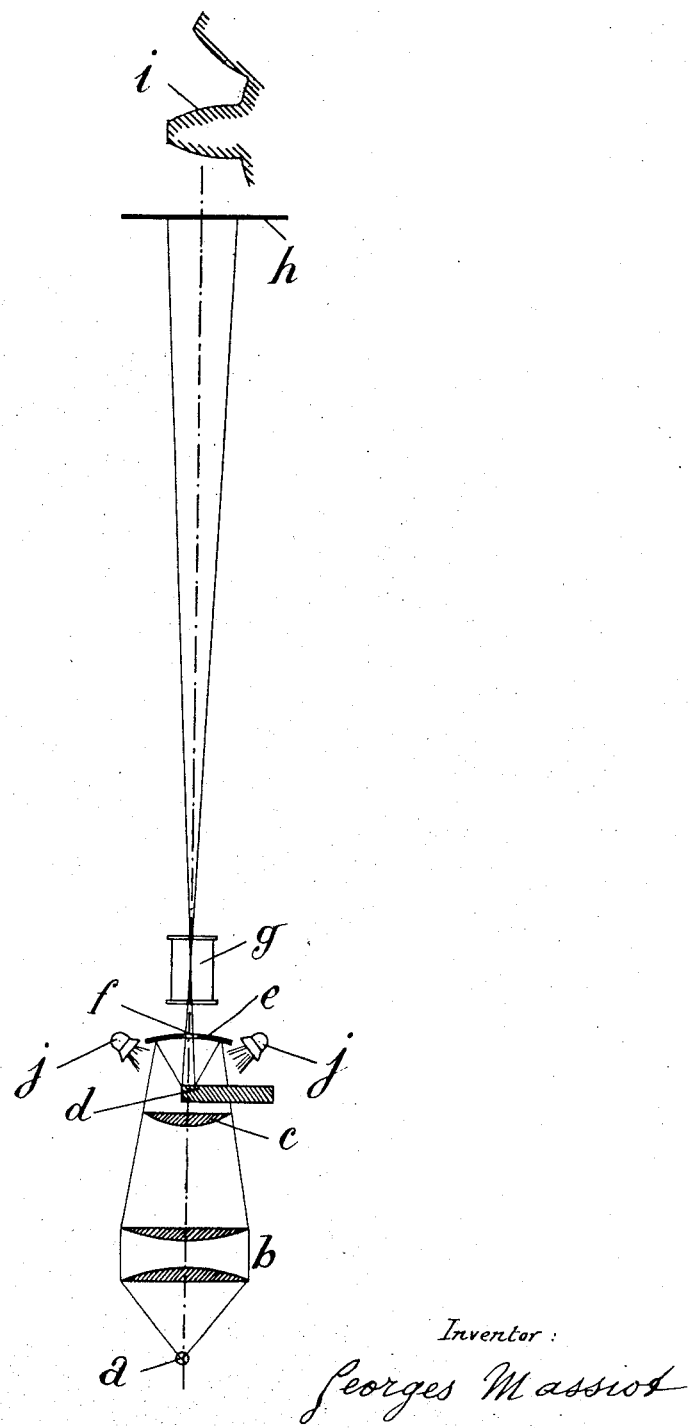

Patented Oct. 16, 1928.

1,687,946

UNITED STATES PATENT OFFICE.

GEORGES MASSIOT, OF PARIS, FRANCE.

APPARATUS FOR CHECKING THE PROFILES OF GEAR WHEELS, THE PITCH OF SCREWS, AND SIMILAR ARTICLES.

Application filed February 13, 1925, Serial No. 9,014, and in France February 20, 1924.

This invention relates to a projection apparatus for checking the profiles of gear wheels and the pitch of screws. Apparatus for this purpose have become known in which the piece, the contours of which are to be measured, is placed in front of the suitable collector of a lantern, an objective or a microscopic system projecting the contours of this piece upon a screen on which the ideal profile desired to be obtained has been previously drawn. Apparatus of this type, especially those for checking the profiles of gear wheels possess serious drawbacks. If the pieces are thick the contours are not quite clear when the projection is done by parallel light, and when it is done by convergent light the contours might confound with the shadows produced.

The apparatus according to the invention has for its object, in view of ensuring accurate checking, to exactly define the intersection of the planes to be measured and with this object in view to ascertain which is the plane concerned.

An apparatus according to the invention is diagrammatically shown in the only figure of the accompanying drawing. Between the source of light $a$ and the screen $h$ an objective $g$ is arranged. The light rays from $a$ traverse the condenser $b$ and the lens $c$ designed to concentrate the light rays towards the objective $g$. The piece $d$ to be measured or examined is inserted between the lens $c$ and the objective $g$. According to the invention a mirror $e$ suitably curved is interposed between the lens $c$ and the objective $g$. This mirror $e$ has a hole $f$ at the centre which is sufficiently large to allow the shadow of the piece $d$ to pass through it. The light rays which go around the contour of the piece $d$ strike against the mirror $e$ and are reflected to light the part of piece $d$ which is to be examined. On the screen $h$ a projection of the contours of the piece $d$, as shown by $i$, and a true projection of the examined surface will appear, which give an absolutely exact definition of the profile which is to be examined.

With the aid of this apparatus the gaps between teeth of helical gearing can be examined, this being very important for the motor-car industry as this examination cannot be made with the aid of the actually known apparatus owing to the projection of the planes at the rear.

When articles have to be examined which are so bulky that they partly mask the light one or two projectors $j, j$ may be used for lighting the surface to be examined.

I claim:—

An apparatus for checking the profiles of gear-wheels, pitches of screws and similar articles, comprising in combination with the opaque metal element to be examined, a source of light, a device for condensing the light-rays, an objective, a lens for concentrating the light rays towards said objective, a concave mirror having a hole at the centre and arranged close to said objective opposite to said source of light, and means for reflecting the direct light-rays sent out by said source of light by said mirror and then by said opaque metal-body which is examined and which reflects the entire bushel of light-rays towards said objective.

In testimony whereof I affix my signature.

GEORGES MASSIOT.